United States Patent
Ziegler et al.

(10) Patent No.: US 8,763,784 B2
(45) Date of Patent: Jul. 1, 2014

(54) APPARATUS AND METHOD FOR TRANSPORTING CONTAINERS INCLUDING WIRELESS CONDITION DETECTION

(75) Inventors: Manfred Ziegler, Passau (DE); Martin Seger, Neumarkt i.d.Opf (DE)

(73) Assignee: Krones AG, Neutraubling (DE)

( * ) Notice: Subject to any disclaimer, the term of this patent is extended or adjusted under 35 U.S.C. 154(b) by 218 days.

(21) Appl. No.: 13/398,965

(22) Filed: Feb. 17, 2012

(65) Prior Publication Data

US 2012/0211330 A1    Aug. 23, 2012

(30) Foreign Application Priority Data

Feb. 17, 2011 (DE) .......................... 10 2011 011 625

(51) Int. Cl.
*B65G 43/00* (2006.01)
*B65G 43/10* (2006.01)
*B65G 43/08* (2006.01)

(52) U.S. Cl.
CPC ................ *B65G 43/10* (2013.01); *B65G 43/08* (2013.01)
USPC ................... 198/460.1; 198/341.01; 198/349; 198/572; 198/575

(58) Field of Classification Search
USPC ..................... 198/341.01, 349, 572, 575, 577, 198/781.06, 460.1
See application file for complete search history.

(56) References Cited

U.S. PATENT DOCUMENTS

| | | | |
|---|---|---|---|
| 6,793,065 B2 | 9/2004 | Ziegler | |
| 7,542,823 B2 | 6/2009 | Nagai | |
| 7,673,739 B2 * | 3/2010 | Freeman | 198/810.02 |
| 7,793,772 B2 * | 9/2010 | Schafer | 198/460.1 |
| 7,954,621 B2 | 6/2011 | Brandt et al. | |
| 8,186,499 B2 | 5/2012 | Brandt et al. | |
| 2001/0003163 A1 | 6/2001 | Bungert et al. | |
| 2003/0205446 A1 | 11/2003 | Ziegler | |
| 2005/0065641 A1 | 3/2005 | Nagai | |
| 2005/0072655 A1 * | 4/2005 | Raque et al. | 198/455 |

(Continued)

FOREIGN PATENT DOCUMENTS

| | | |
|---|---|---|
| DE | 19826513 | 4/2001 |
| DE | 100 60 581 A1 | 6/2002 |

(Continued)

OTHER PUBLICATIONS

German Search Report issued on Jan. 13, 2012 in corresponding German Patent Application 10 2011 011 625.7.

(Continued)

*Primary Examiner* — Mark A Deuble
(74) *Attorney, Agent, or Firm* — Onello & Mello, LLP

(57) ABSTRACT

In an apparatus for transporting containers, a first transport unit including a first drive unit transports the containers along a first transport section, and a second transport unit including a second drive unit transports the containers along a second transport section. First and second sensor units detect a condition of the containers transported by the first and second transport units. At least one control unit controls at least one of the first and second drive units in response to at least one of the first and second conditions detected by the corresponding first or second sensor units. At least one of the first and second sensor units includes a signal transmission unit that wirelessly emits a signal characteristic of the respective at least one first or at least one second condition to a receiving unit of the control unit.

22 Claims, 1 Drawing Sheet

(56) References Cited

U.S. PATENT DOCUMENTS

| | | |
|---|---|---|
| 2009/0084657 A1 | 4/2009 | Brandt et al. |
| 2009/0135019 A1 | 5/2009 | Smith |
| 2009/0194390 A1* | 8/2009 | Freeman ................. 198/810.01 |
| 2010/0222920 A1 | 9/2010 | Andreoli |
| 2011/0083943 A1* | 4/2011 | Zhang et al. ................. 198/570 |
| 2011/0132724 A1 | 6/2011 | Buchkremer |
| 2011/0144800 A1 | 6/2011 | Brandt et al. |
| 2011/0259713 A1* | 10/2011 | Glass et al. ............. 198/370.01 |

FOREIGN PATENT DOCUMENTS

| | | |
|---|---|---|
| DE | 10060581 | 6/2002 |
| DE | 10121833 | 11/2002 |
| DE | 10 2004 038135 A1 | 3/2005 |
| DE | 10 2007 025553 A1 | 4/2008 |
| DE | 102008053715 | 5/2010 |
| EP | 2 042 449 A1 | 4/2009 |
| WO | 02/090218 A1 | 11/2002 |
| WO | 2006/102691 A2 | 10/2006 |
| WO | 2009/047282 A1 | 4/2009 |

OTHER PUBLICATIONS

Search Report issued on May 25, 2012 in European patent application No. 12154655.0-1261.

* cited by examiner

APPARATUS AND METHOD FOR TRANSPORTING CONTAINERS INCLUDING WIRELESS CONDITION DETECTION

RELATED APPLICATION

This application claims priority to German Patent Application No. 10 2011 011 625.7, filed on Feb. 17, 2011, in the German Patent and Trademark Office, the content of which is incorporated herein by reference in its entirety.

BACKGROUND

Embodiments relate to an apparatus and method for transporting containers or container packs. Containers or container packs can be transported along several transport sections of a manufacturing apparatus by different consecutive transport units. Each of these individual transport units can include a drive such as for example an electric motor, in order to convey containers or container packs. Further, such apparatus can include sensor units, such as for example congestion detectors which detect congestion of the containers or container packs along the transport route, in order to control the respective drive units, to allow for proper system reaction in such situations.

German Reference DE 10 2008 053 715 A1, discloses a transport system for packaging means. The transport system is described as including an electric measurement module that in turn includes a sensor for detecting a physical parameter. Further, the measurement module is provided on a transport element and includes an RFID-TAG or RFID transponder of suitable design. In other systems, a plurality of integrated sensor units are included which are connected to the individual control units for example via BUS systems. For transport control, such sensors are conventionally wired with so-called BUS lines. Such systems are associated with high costs and are limited by cleaning-related disadvantages. A further disadvantage is electromagnetic compatibility (EMV), which can only be achieved through means of suitable shielding measures or on-site separation of power cables.

SUMMARY

Embodiments of the present inventive concepts provide apparatus and a method which allow for cost reduction as compared to conventional approaches.

An apparatus in accordance with the present inventive concepts for transporting containers or container packs includes a first transport unit, by means of which the containers or container packs are transported along a first predefined transport section, which first transport unit has at least one drive unit, for example in the form of an electric motor, for moving the containers or container packs. For purposes of the present disclosure, the term "containers" is defined to include individual containers, multiple containers in container packs, or other containers or items that may be transported by the apparatus.

Further, the apparatus includes a second transport unit that is mounted downstream of the first transport unit in the transport direction of the containers or container packs and that transports the containers or container packs along a second transport section. This second transport section includes at least one drive unit for moving the containers or container packs.

Further, the apparatus can includes a first sensor unit that detects at least one first condition of the containers or container packs transported by the first transport unit along the first transport section, as well as a second sensor unit that detects at least one second condition of the containers or container packs transported by the second transport unit along the second transport section, as well as at least one control unit that controls at least one drive unit taking into account at least one condition detected by one of the sensor units. According to the present inventive concepts, at least one sensor unit includes at least one transmission unit for emitting a signal that is characteristic of the condition (in particular to a receiving unit) in a wireless manner.

This condition may for example take the form of an error condition in the transport, such as for example a congestion condition and/or a jamming of the containers, for example, a message saying that too many containers are passing a certain control section. In addition, the condition may also be another error condition, such as for example a faulty container (for example a damaged container) or a container that is being transported in a lying orientation or the like. It would also be possible that the error condition indicates the presence of a container of another container category or that one or several containers are being transported in a wrong orientation.

The containers can comprise, in particular, glass bottles or plastic bottles, however, as mentioned above, it would also be possible to transport container packs, which means groups made up of several containers, instead of containers.

Advantageously, the mentioned signal can be forwarded at least indirectly to a drive or the drive unit, in order to effect, as a reaction to this signal, a control of the respective drive unit. As a reaction to this signal, suitable countermeasures may be initiated, for example a stop or a decelerated operation of the respective drive unit or the output of an alarm signal to the user. It is also possible to activate ejection mechanisms, if necessary, which eject certain containers from the process. In addition, additional drive units may be appropriately driven as a reaction to this signal, in particular drive units that precede (or follow) the corresponding drive unit in the transport direction of the containers or container packs.

In a further advantageous embodiment, the apparatus includes a display unit for outputting error messages for example on a screen, a touch screen or a monitor, which indicate to the user whether, and if so, in which areas errors have occurred. Advantageously, the sensor unit is a congestion switch. It would further be possible for the control unit to be a central control unit of for example a programmable logic controller (PLC) that receives signals from a plurality of sensor units and controls the respective drive units as a reaction to these signals.

In a further advantageous embodiment, the transport unit or its associated controller includes a storage unit in which addresses for the individual sensor units are deposited. In this way it is ensured that the individual signals that are emitted by the transmission unit and received by the receiving unit, are respectively associated with the relevant sensor units and thus also with the correct positions of the respective transport sections. Advantageously here, the addresses deposited in this storage unit are associated with an operand and can be modified in order to facilitate a replacement of the sensor units.

In an advantageous embodiment, the first and second sensor units respectively include transmission units for emitting signals characteristic of the condition to the receiving unit in a wireless manner.

Advantageously, as mentioned above, each sensor unit has associated therewith an address which uniquely identifies this sensor unit.

In a further advantageous embodiment, at least one sensor unit can be wirelessly supplied with energy for the operation thereof. Therefore, the sensors units advantageously do not need their own energy supply. It is also possible here for this supply of energy to be carried out inductively. Thus, for example, a polling signal that detects the condition can at the same time supply said sensor unit with energy. However, the energy can also be made available indirectly by a movement of the containers or the transport unit.

In a further advantageous embodiment, the apparatus includes at least one energy supply unit which supplies at least one of the sensor units, preferably a plurality of sensor units, with energy in a wireless manner. Advantageously, this energy supply unit is also the receiving unit which is also used for reading the signals.

In a further advantageous embodiment, at least one transport unit has a conveyor belt for conveying the containers or container packs. This is advantageously used for transporting the containers by their bottom surfaces. Advantageously, several containers can also be transported next to each other in a direction that is oblique to, or in a vertical direction with respect to, the transport direction.

In a further advantageous embodiment, at least one sensor unit has a so-called SAW sensor (surface acoustic wave). Such SAW-based apparatus are commonly employed as filters or oscillators. Advantageously, the sensor includes a piezoelectric element, in order to convert electric energy into mechanical energy (in the form of the surface waves). By means of these elements, also acoustic waves can be converted into electric signals.

In order to achieve substantial cost reductions and also tangible energy savings, sensors based on SAW technology can be employed. These sensors also offer the advantage of a unique association, for example via an address and/or a frequency.

Advantageously, conditions are changed and/or information is obtained by means of an external energy input. By means of such SAW or surface waves (OFW components), novel identification and sensor elements can be made possible, which can be wirelessly read and are passive. These sensors include transponders which store the polling signals until all the environmental echoes have decayed. Subsequently, a characteristic response pattern of the transporter is output, for example to the receiving unit. It would be conceivable here for the respective sensors to respond with their constant identification pattern (which would advantageously also be unique to the respective sensors).

An advantage of such sensors lies in the fact that they can operate purely passively. What is of importance here is the distance between the polling device and the respective sensor. Since semiconductor electronics need a minimum voltage, the distance from which onwards it is no longer possible to draw enough power from the HF field of the polling unit determines the maximum range of the system. In this way, it can be ensured already via the distance between a polling unit and a sensor unit that by means of a certain polling unit, only a certain sensor unit or a certain group of sensor units can be polled. Advantageously, the apparatus includes several polling units, however, all of these polling units can communicate with the same control unit.

These sensor units can receive the respective signal via a transponder antenna.

If the sensor units are SAW sensors the problem occurs that due to legal restrictions, it is not possible to use the whole frequency band around the defined carrier frequency as may be desired. This means a reduction of the possible addresses to approximately 64. In order to solve this problem, it is possible to activate one or more transmission stations in a chronological order and to respectively scan only the tags or sensor units in the respective reception range. In this way, the sensor units can be read in the manner of a multiplex process.

In a further advantageous embodiment, at least one sensor unit comprises a Hall element. Such Hall elements or Hall sensors use the Hall effect for measuring magnetic fields and electric current or for sensing a position. If a current flows through such a sensor unit and the sensor unit is moved into a magnetic field that extends vertically to this current, this element will deliver an output voltage that is proportional to the product of the current and the magnetic field strength. In this way it is possible to use such Hall sensors as touch-free and contactless signal generators.

For example, it would be possible for the transport units to include movable elements such as for example congestion compensation rockers which in turn are equipped with permanent magnets. These permanent magnets in turn could be used for transferring energy to the Hall sensors and at the same time transferring this oscillating movement as information (in particular in respect to whether the stowage switch is occupied) to a higher order control unit.

However, the permanent magnets could also be arranged on movable parts of the transport unit, for example on conveyor belts or guide rollers, so that during working operation, the necessary energy can advantageously be generated as a result of the movement of the transport unit and thus of the movements of these permanent magnets. The sensor units themselves are advantageously arranged to be stationary.

In addition, it would also be possible for the sensor units to be SAW sensors which moreover also use the Hall effect (in particular for detecting measured values), which means that combined SAW-Hall sensors are used.

In a further advantageous embodiment, the individual addresses of the respective sensor units are stored in the receiving unit, and these stored addresses can preferably also be modified, which is advantageous for example in the case of replacing a sensor unit. Thus it is possible that when a sensor unit is replaced, also the receiving unit can automatically be adapted to the new sensor unit or to the new address emitted thereby.

To this end it is possible for the receiving unit to have a learning function that reads a respective new address. It is conceivable here for the receiving unit to have a switching unit, by means of which, on demand, a working mode can be switched to a learning mode in order to read new sensor units. It is also conceivable for the function to be designed in such a way that in the case of multiple transmissions of a new address, this new address is input into a storage system. At the same time it can be checked whether other addresses are no longer transmitted, for example the addresses of a sensor unit that is no longer present. In this case, the replacement sensor unit can adopt the function of the replaced sensor unit.

A further advantage of this apparatus is that a location-independent mounting is possible and that also sensor units can be accommodated in freely selectable positions.

Advantageously, the apparatus includes a filling unit for filling the containers with a flowable medium, preferably a liquid and in particular a beverage, and this filling unit can particularly advantageously be installed upstream of the above-mentioned transport units in the transport direction of the containers or container packs. The filling unit, however, can also be installed downstream of the transport units in the transport direction of the containers or container packs.

Advantageously, the transport units are used for transporting filled packs. In a further advantageous embodiment, the mentioned transport units are arranged directly one after another.

Embodiments are further directed to a method for transporting containers or container packs, wherein the containers or container packs are transported by a first transport unit along a predefined first transport section and this first transport unit has at least one drive unit for moving the containers or container packs, and wherein the containers or container packs are transported by a second transport unit installed downstream of the first transport unit in the transport direction of the containers or container packs along a second transport section, which second transport unit has at least one drive unit for moving the containers or container packs.

Further, at least one first sensor unit detects at least one condition of the containers or container packs transported by the first transport unit along the first transport section. A second sensor unit detects at least one second condition of the containers or container packs transported by the first transport unit along the second transport section and at least one control unit controls at least one drive unit taking into account at least one condition detected by at least one of the sensor units.

According to the inventive concepts, at least one sensor unit emits, by means of a transmission unit, a signal characteristic of the condition and/or one unique address to a receiving unit and/or a display unit in a wireless manner.

With regard to the method it is therefore also proposed to emit the respective measurement signals in a wireless manner to a receiving unit. Advantageously, the transmission unit is wirelessly activated or supplied with energy in order to emit the respective signal to the receiving unit. This activation can be carried out for example by means of radio waves and/or in an inductive manner. Preferably, at least one sensor unit and particularly preferably the sensor units are arranged at least partially downstream of the drive units (i.e. the drive units that are controlled on the basis of signals output by these sensor units) in the direction of movement of the containers or container packs. This means that on the basis of the signal emitted by a certain sensor unit, a drive unit is preferably controlled that is arranged upstream of this drive unit in the transport direction of the containers or container packs.

A further advantageous method includes the automated association of the addresses of the sensors with the operands of a control unit, if a sensor needs to be replaced for maintenance or repair purposes. In the same way, an association with the controller can be carried out during the initial commissioning. To this end, an operand is preferably selected from a previously compiled selection list, and the address is advantageously associated with the selected operands in the controller by means of a receiving unit on the display unit. In order to be able to ensure a unique association, the currently read address is preferably displayed in parallel to the operand and the association is stored by confirmation.

In one aspect, an apparatus for transporting containers, comprises: a first transport unit that transports the containers along a first transport section, the first transport unit including a first drive unit for moving the containers; a second transport unit that is arranged downstream of the first transport unit in a transport direction of the containers and transports the containers along a second transport section, the second transport unit including a second drive unit for moving the containers; a first sensor unit that detects at least one first condition of the containers transported by the first transport unit along the first transport section; a second sensor unit that detects at least one second condition of the containers transported by the second transport unit along the second transport section; and at least one control unit that controls at least one of the first and second drive units in response to at least one of the first and second conditions detected by the corresponding first or second sensor units, wherein at least one of the first and second sensor units includes a signal transmission unit that wirelessly emits a signal characteristic of the respective at least one first or at least one second condition to a receiving unit of the control unit.

In some embodiments, the containers comprise individual containers or container packs of multiple containers.

In some embodiments, at least one of the first drive unit and the second drive unit comprises a plurality of drive units.

In some embodiments, the first and second sensor units both include transmission units in order to wirelessly emit signals characteristic of the respective at least one first or at least one second condition to a receiving unit of the control unit.

In some embodiments, wherein each one of the first and second sensor units is associated with an address that uniquely identifies the sensor unit.

In some embodiments, wherein at least one of the first and second sensor units is wirelessly supplied with energy for the operation thereof.

In some embodiments, wherein the apparatus further comprises an energy supply unit that wirelessly supplies energy to the at least one of the first and second sensor units.

In some embodiments, wherein at least one of the first and second transport units includes a conveyor belt for conveying the containers.

In some embodiments, wherein at least one of the first and second sensor units comprises a surface-acoustic-wave (SAW) sensor.

In some embodiments, wherein at least one of the first and second sensor units comprises a Hall element.

In another aspect, a method for transporting containers, comprises: transporting the containers by a first transport unit along a first transport section, the first transport unit including a first drive unit for moving the containers; transporting the containers by a second transport unit that is arranged downstream of the first transport unit in a transport direction of the containers along a second transport section, the second transport unit including a second drive unit for moving the containers; detecting at least one first condition of the containers transported by the first transport unit along the first transport section at a first sensor unit; detecting at least one second condition of the containers transported by the second transport unit along the second transport section at a second sensor unit; controlling at least one of the first and second drive unit in response to at least one of the first and second conditions detected by the corresponding first or second sensor units at least one control unit; and wirelessly emitting a signal characteristic of the respective at least one first or at least one second condition to a receiving unit of the control unit from a signal transmission unit of at least one of the first and second sensor units.

In some embodiments, the signal emitted wirelessly by the signal transmission unit of at least one of the first and second sensor units further indicates a unique address of the at least one of the first and second sensor units, and wherein by way of a preselection on an associated display unit, the address is associated with an operand in the controller.

In some embodiments, the address is stored by confirmation.

In some embodiments, wherein the containers comprise individual containers or container packs of multiple containers.

In some embodiments, at least one of the first drive unit and the second drive unit comprises a plurality of drive units.

In some embodiments, the first and second sensor units both include transmission units in order to wirelessly emit signals characteristic of the respective at least one first or at least one second condition to a receiving unit of the control unit.

In some embodiments, each one of the first and second sensor units is associated with an address that uniquely identifies the sensor unit.

In some embodiments, the method further comprises wirelessly supplying the first and second sensor units with energy for the operation thereof.

In some embodiments, at least one of the first and second sensor units comprises a surface-acoustic-wave (SAW) sensor.

In some embodiments, at least one of the first and second sensor units comprises a Hall element.

BRIEF DESCRIPTION OF THE DRAWINGS

The drawings are not necessarily to scale, emphasis instead being placed upon illustrating the principles of the inventive concept. Further advantages and embodiments will become evident from the attached drawings, wherein.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1:
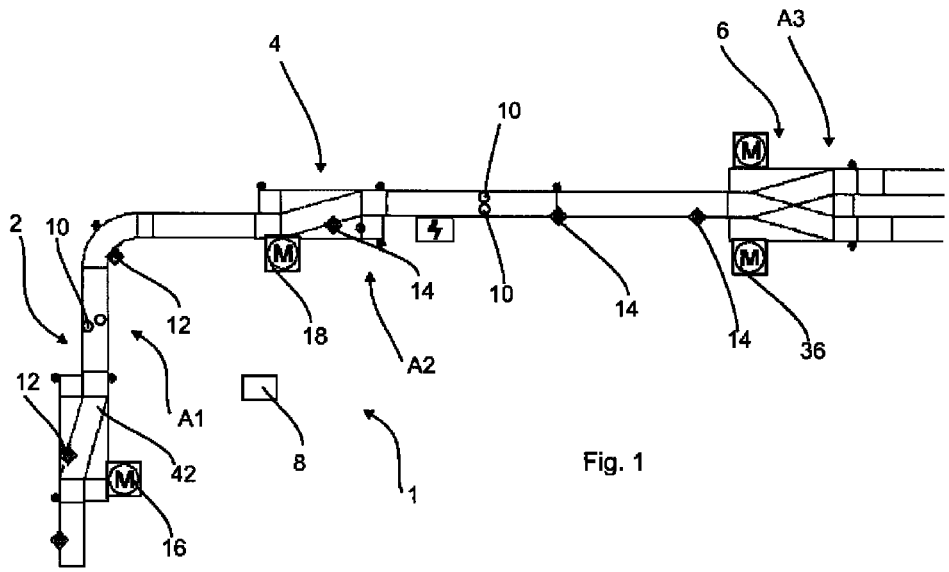
FIG. 1 shows a schematic view of an apparatus and method according to embodiments of the present inventive concepts.

FIG. 1 shows a schematic view of an apparatus 1 according to the embodiments of the present inventive concepts for transporting containers 10.

In this example embodiment, the apparatus includes a first transport unit 2 that conveys the containers 10 along a first transport section A1. This first transport unit 2 includes a first drive unit 16 that is used for moving the containers or container packs 10, for example for driving a transport belt. The first transport unit 2 is followed by a second transport unit 4 in a direction of container process flow that transports the containers along a second predefined transport section A2. The second transport unit 4 in turn includes a second drive unit 18. The second transport unit 4 is followed by a third transport unit 6 in a direction of container process flow that transports the containers or container packs along the a third transport section A3. Also the third transport unit 6 in turn includes a third drive unit 36.

Reference numerals 12 and 14 respectively relate to sensor units which receive a signal that is characteristic of a condition of the containers, for example a congestion condition of the individual containers. Each of these sensor units additionally includes a transmission unit (not shown in FIG. 1) which respectively transmits a respective sensor signal to a control unit 8. The control unit 8 in turn controls the individual drive units 16, 18, 36 as a function of the data sensed and transmitted by the sensor units 12 and 14.

Figure 2:
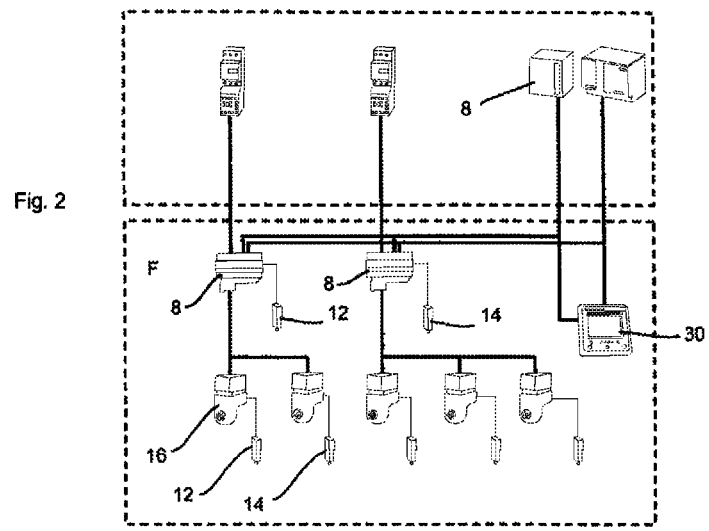
FIG. 2 shows a schematic view of an apparatus and method according to embodiments of the present inventive concepts.

FIG. 2 is a system-level view in accordance with embodiments of the present inventive concepts. Here again, the individual drive units 16 and 18 as well as the sensor units 12 and 14 associated therewith are shown. As shown in FIG. 2, a plurality of sensor units 12, 14 may be provided. Reference numeral 30 identifies a display unit that can display, for example, transport conditions, for example normal conditions and congestion conditions. The display unit 30 can also be used to output alarm signals to the user.

In the view shown in FIG. 2, the sensors 12, 14, drives 16, 18 and respective master controllers 8 may respectively be formed as units on the field level F. In this manner, the required number of switching cabinets can be reduced. Optionally, the sensors 16, 18 could also be wired via gateways or via decentralised frequency convertors, for example, of the Movigear, FCD 300, or similar type. The control unit 8 shown here may for example comprise SNI master units (SNI=signal network installation) and/or programmable logic controllers. In some embodiments, temperature switches or sensors can be installed directly on the transport units 2, 4, 6 of FIG. 1. In some embodiments, the individual drive units 16, 18 and 36 can be additionally manually controlled.

Figure 3:
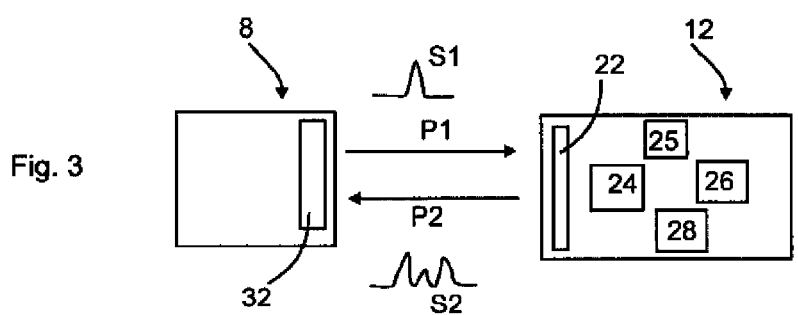
FIG. 3 shows a schematic view of a sensor unit according to embodiments of the present inventive concepts.

FIG. 3 shows a schematic view of a sensor unit according to embodiments of the present inventive concepts. In this example, the detection of measured values is illustrated. Reference numeral 12 again relates to the sensor unit which includes here a transmission and receiving unit 22, for example in the form of an antenna. For purposes of the present disclosure, the transmission and receiving unit is referred to collectively herein as a "signal transmission unit". The sensor unit can further include a storage unit 24 in which for example the address of the sensor unit 12 may be stored. In addition, a sensor element 26 is provided which is used for detecting the condition or conditions of the associated transport unit A1, A2, A3. A processor unit 28 can be provided which evaluates the recorded data. The control unit 8 may be used to transfer, via a signal transmission unit 32, a polling signal S1 in the direction of arrow P1 to the sensor unit 12.

This polling signal S1 can also be used for supplying the sensor unit 12 or the sensor elements 26 with energy. In response to the polling signal S1, the sensor unit can emit a response signal S2 in the direction of arrow P2 that is characteristic of the address of the sensor unit 12. The response signal can further be characteristic of the respectively detected measured value. The transmission unit 32 may also be equipped as a receiving unit for receiving the response signal S2. In other embodiments, the apparatus can include a separate receiving unit for receiving the signal S2. In some embodiments, as mentioned herein, the signal S1 can be used to ensure or replenish the energy supply for the sensor unit 12. In other embodiments, the energy supply could also be ensured or replenished in a different manner, for example by means of the congestion compensation rocker as mentioned above, which can be used to generate the energy needed for this measurement by way of an inductive element. Moreover, the sensor unit 12 itself could include storage means such as for example a battery.

In some embodiments, the sensor unit 12 can include one or more energy conversion elements, for example a Hall sensor 25 that employs in particular a consequence of the movement of the containers, for example via a stowage compensation rocker, to generate energy for supplying the sensor unit 12. In the simplest case it would thus be possible to directly use a movement of the corresponding congestion compensation rocker to emit a signal S2, so that the transmission unit 32 can detect the occurrence of an error condition.

In some embodiments, a single control unit 8 can, as shown in the illustration of FIG. 1, control all of the drive units 16, 18 and 36. In other embodiments, it is possible for each drive unit 16, 18, 36 to have a separate control unit or separate sensor units associated therewith, so that multiple control units 8 are employed by the apparatus.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. An apparatus for transporting containers, comprising:
    a first transport unit that transports the containers along a first transport section, the first transport unit including a first drive unit for moving the containers;
    a second transport unit that is arranged downstream of the first transport unit in a transport direction of the containers and transports the containers along a second transport section, the second transport unit including a second drive unit for moving the containers;
    a first sensor unit that detects at least one first condition of the containers transported by the first transport unit along the first transport section;
    a second sensor unit that detects at least one second condition of the containers transported by the second transport unit along the second transport section; and
    at least one control unit that controls at least one of the first and second drive units in response to at least one of the first and second conditions detected by the corresponding first or second sensor units,
    wherein at least one of the first and second sensor units includes a signal transmission unit that wirelessly emits a signal characteristic of the respective at least one first or at least one second condition to a receiving unit of the control unit, wherein at least one of the first and second sensor units comprises a surface-acoustic-wave (SAW) sensor.

2. The apparatus of claim 1 wherein the containers comprise individual containers or container packs of multiple containers.

3. The apparatus of claim 1 wherein at least one of the first drive unit and the second drive unit comprises a plurality of drive units.

4. The apparatus of claim 1, wherein the first and second sensor units both include transmission units in order to wirelessly emit signals characteristic of the respective at least one first or at least one second condition to a receiving unit of the control unit.

5. The apparatus of claim 1, wherein the first and second sensor units are associated with an address that uniquely identifies the sensor unit.

6. The apparatus of claim 1, wherein at least one of the first and second sensor units is wirelessly supplied with energy for the operation thereof.

7. The apparatus of claim 6, wherein the apparatus further comprises an energy supply unit that wirelessly supplies energy to the at least one of the first and second sensor units.

8. The apparatus of claim 1, wherein at least one of the first and second transport units includes a conveyor belt for conveying the containers.

9. The apparatus of claim 1, wherein at least one of the first and second sensor units comprises a Hall element.

10. The method according to claim 1, wherein at least one of the first and second sensor units comprises a Hall element.

11. The apparatus according to claim 1, wherein the apparatus includes one or more polling stations.

12. The apparatus according to claim 11, wherein the one or more polling stations are activated in a chronological order to respectively scan only sensor units in a respective reception range.

13. A method for transporting containers, comprising:
    transporting the containers by a first transport unit along a first transport section, the first transport unit including a first drive unit for moving the containers;
    transporting the containers by a second transport unit that is arranged downstream of the first transport unit in a transport direction of the containers along a second transport section, the second transport unit including a second drive unit for moving the containers;
    detecting at least one first condition of the containers transported by the first transport unit along the first transport section at a first sensor unit;
    detecting at least one second condition of the containers transported by the second transport unit along the second transport section at a second sensor unit;
    controlling at least one of the first and second drive unit in response to at least one of the first and second conditions detected by the corresponding first or second sensor units at least one control unit; and
    wirelessly emitting a signal characteristic of the respective at least one first or at least one second condition to a receiving unit of the control unit from a signal transmission unit of at least one of the first and second sensor units, wherein at least one of the first and second sensor units comprises a surface-acoustic-wave (SAW) sensor.

14. The method as claimed in claim 13, wherein the signal emitted wirelessly by the signal transmission unit of at least one of the first and second sensor units further indicates a unique address of the at least one of the first and second sensor units, and wherein by way of a preselection on an associated display unit, the address is associated with an operand in the controller.

15. The method according to claim 14, wherein the address is stored by confirmation.

16. The method according to claim 13 wherein the containers comprise individual containers or container packs of multiple containers.

17. The method according to claim 13 wherein at least one of the first drive unit and the second drive unit comprises a plurality of drive units.

18. The method according to claim 13, wherein the first and second sensor units both include transmission units in order to wirelessly emit signals characteristic of the respective at least one first or at least one second condition to a receiving unit of the control unit.

19. The method according to claim 13, wherein the first and second sensor units are associated with an address that uniquely identifies the sensor unit.

20. The method according to claim 13, further comprising wirelessly supplying the first and second sensor units with energy for the operation thereof.

21. The method according to claim 13, wherein the apparatus includes one or more polling stations.

22. The method according to claim 21, wherein the one or more polling stations are activated in a chronological order to respectively scan only sensor units in a respective reception range.

* * * * *